United States Patent
Jansen

(10) Patent No.: US 12,246,876 B2
(45) Date of Patent: Mar. 11, 2025

(54) MULTILAYER PREFORM AND CONTAINER

(71) Applicant: Stora Enso OYJ, Helsinki (FI)

(72) Inventor: Cor Jansen, Rijen (NL)

(73) Assignee: Stora Enso OYJ, Helsinki (FI)

( * ) Notice: Subject to any disclaimer, the term of this patent is extended or adjusted under 35 U.S.C. 154(b) by 137 days.

(21) Appl. No.: 17/996,938

(22) PCT Filed: May 10, 2021

(86) PCT No.: PCT/IB2021/053950
§ 371 (c)(1),
(2) Date: Oct. 24, 2022

(87) PCT Pub. No.: WO2021/229407
PCT Pub. Date: Nov. 18, 2021

(65) Prior Publication Data
US 2023/0166881 A1    Jun. 1, 2023

(30) Foreign Application Priority Data

May 11, 2020   (SE) .................................. 2050546-7

(51) Int. Cl.
| | | |
|---|---|---|
| B65D 1/02 | (2006.01) | |
| B29C 49/22 | (2006.01) | |
| B32B 1/00 | (2006.01) | |
| B32B 27/08 | (2006.01) | |
| B32B 27/36 | (2006.01) | |
| B29C 45/16 | (2006.01) | |
| B29C 49/10 | (2006.01) | |
| B29K 67/00 | (2006.01) | |
| B29L 31/00 | (2006.01) | |

(52) U.S. Cl.
CPC ............ B65D 1/0215 (2013.01); B29C 49/22 (2013.01); B32B 1/00 (2013.01); B32B 27/08 (2013.01); B32B 27/36 (2013.01); *B29C 45/164* (2013.01); *B29C 49/10* (2013.01); *B29K 2067/003* (2013.01); *B29L 2031/7158* (2013.01); *B32B 2250/03* (2013.01); *B32B 2250/244* (2013.01); *B32B 2439/60* (2013.01)

(58) Field of Classification Search
CPC ..... B65D 1/0215; B29C 49/22; B29C 45/164; B29C 49/10; B29C 2949/0715; B29C 2949/30; B29C 49/071; B29C 2949/3016; B29C 2949/3034; B29C 49/06; B29C 49/0005; B29C 2949/3028; B32B 1/00; B32B 27/08; B32B 27/36; B32B 2250/03; B32B 2250/244; B32B 2439/60; B32B 2250/40; B32B 2270/00; B32B 2307/308; B32B 2307/718; B32B 2307/7244; B32B 2307/732; B32B 7/02; B32B 7/027; B32B 2439/70; B29K 2067/003; B29K 2067/00; B29K 2067/04; B29L 2031/7158; B29L 2031/712; B29L 2023/22; B29B 11/14; B29B 11/08; C08G 63/181; C08G 63/199; C08G 63/672; C08L 67/02

See application file for complete search history.

(56) References Cited

U.S. PATENT DOCUMENTS

| | | | | |
|---|---|---|---|---|
| 4,609,516 | A | * | 9/1986 | Krishnakumar .... B29C 45/1643 264/328.8 |
| 5,032,341 | A | * | 7/1991 | Krishnakumar .... B29C 45/1643 264/513 |
| 5,582,788 | A | * | 12/1996 | Collette ............... B29C 45/7207 264/328.8 |
| 8,822,001 | B2 | * | 9/2014 | Akkapeddi ............. B29B 11/14 428/35.7 |
| 10,940,630 | B2 | | 3/2021 | Moffitt et al. |
| 2006/0019045 | A1 | * | 1/2006 | Bourgeois ................ C08K 5/06 428/35.7 |
| 2008/0153939 | A1 | * | 6/2008 | Schmidt .................. B32B 27/18 523/100 |
| 2015/0110983 | A1 | | 4/2015 | Kriegel et al. |
| 2018/0022866 | A1 | | 1/2018 | Moffitt et al. |

(Continued)

FOREIGN PATENT DOCUMENTS

| | | |
|---|---|---|
| EP | 3194134 A1 | 7/2017 |
| EP | 3369846 A1 | 9/2018 |

(Continued)

OTHER PUBLICATIONS

International Search Report from corresponding PCT application No. PCT/IB2021/053950, mailed on Jul. 26, 2021.

(Continued)

*Primary Examiner* — Kareen K Thomas
(74) *Attorney, Agent, or Firm* — Greer, Burns & Crain, Ltd.

(57) ABSTRACT

The present invention relates to a multilayer container preform and a multilayer container, said preform or container comprising a base, a body and a neck finish, said base and body comprising an outer layer defining an exterior surface, an inner layer defining an interior surface and interior space, and an intermediate layer disposed between the outer layer and the inner layer, said outer layer and said inner layer comprising a primary material selected from the group consisting of a 2,5-furandicarboxylate polyester or co-polyester or a blend thereof, and said intermediate layer comprising a secondary material different from the primary material, but compatible with the primary material. The invention relates to methods of producing such a multilayer container preform and multilayer container

21 Claims, No Drawings

(56) References Cited

U.S. PATENT DOCUMENTS

| | | |
|---|---|---|
| 2018/0304495 A1 | 10/2018 | Dornbach |
| 2019/0085163 A1 | 3/2019 | Fagan et al. |
| 2020/0283587 A1 | 9/2020 | van Berkel et al. |

FOREIGN PATENT DOCUMENTS

| | | |
|---|---|---|
| JP | 2018104070 A | 7/2018 |
| JP | 2018199258 A | 12/2018 |
| JP | 2020066147 A | 4/2020 |
| WO | 2010077133 A1 | 7/2010 |
| WO | 2019115535 A1 | 6/2019 |

OTHER PUBLICATIONS

Extended European Search Report from corresponding European application No. 21804439.4, dated May 17, 2024.

\* cited by examiner

MULTILAYER PREFORM AND CONTAINER

This application is a U.S. National Phase under 35 U.S.C. § 371 of International Application No. PCT/IB2021/053950, filed May 10, 2021, which claims priority under 35 U.S.C. §§ 119 and 365 to Swedish Application No. 2050546-7 filed May 11, 2020.

TECHNICAL FIELD

The present disclosure relates to plastic containers and preforms for producing plastic containers by stretch blow molding.

BACKGROUND

Plastic containers, such as plastic bottles are generally manufactured by a blow molding process. Often a so-called preform is first prepared by injection molding processes. The preform typically resembles a test tube with the bottle-cap threads already molded into place. The preform is then subjected to a stretch blow molding process to obtain the finished container. Multilayer preforms having different layers formed of different materials can be prepared by co-injection molding processes. Co-injection molding of multilayer preforms is for example described in U.S. Pat. No. 4,609,516.

Polyethylene terephthalate (PET) is a polymer generally used for making containers. PET resins are commonly used to produce bottles for beverages in view of its combination of clarity; mechanical, and gas barrier properties. PET is a polyester made from terephthalic acid (TA) and ethylene glycol (EG). Most commercial methods to produce PET utilize raw materials derived from petrochemicals. As the popularity of PET packaging has grown, concerns regarding the environmental impact of petrochemically derived PET have become more significant. There is a demand for polymers based on renewables, for example that can be efficiently biosourced, to replace PET.

Bottles resulting from blow molding process are often sensitive to hot content at a temperature greater than or equal to 70° C. The filling temperature of the hot liquid is often far above glass transition temperature ("$T_g$") of the container material. Filling such bottles with hot content often results in permanent deformations in the bottles. The bottle neck finish needs to be crystallized or needs to be thick in order to limit deformation of the neck finish and maintain a secure cap sealing during the shelf life of the product. To prevent deformation hot-fill bottles may be manufactured with a so-called heat-set process. During bottle blowing the bottle is heated in order increase the crystallinity of the material and thereby increase the heat stability of the bottle.

For oxygen sensitive products an additional oxygen barrier is often needed in order to prevent degradation of the filled liquid. An oxygen barrier can be achieved with for example a blend, a multilayer structure, or internal coating. A blend or multilayer structure is often not useful as the barrier material is prone to crystallization during the heat-set process which may show as a whitening of the material. Internal coating is an expensive solution and can only be applied on the finished blown container and not on the preform.

Previous strategies for replacing PET in blow molded containers have generally required compromise as to physical performance of the container and/or cost of materials. As such, there remains a need for novel strategies to limit the environmental impact of petrochemically derived PET while still satisfying consumer needs for plastic containers with appropriate physical performance characteristics.

Polyesters based on 2,5-furandicarboxylic acid (FDCA), particularly polyethylene furanoate (PEF), are known for their excellent gas barrier properties and relatively high glass transition temperature, $T_g$. The $T_g$ of PEF is about 86° C., which can be compared to the $T_g$ of PET of about 74° C. The use of 2,5-furandicarboxylate polyesters in plastic containers and preforms for producing plastic containers is described, e.g., in US 2015/0110983A1.

2,5-furandicarboxylate polyesters can also be at least partially biosourced. For example, WO 2010/077133 describes appropriate processes for making a PEF polymer having a 2,5-furandicarboxylate moiety within the polymer backbone. This polymer is prepared by esterification of the 2,5-furandicarboxylate moiety, 2,5-furandicarboxylic acid (FDCA) or dimethyl-2,5-furandicarboxylate (DMF) and condensation of the ester with a dial or polyol (e.g. ethylene glycol, 1,3-propanediol, 1,4-butanediol, 1,5-pentanediol, 1,4-cyclo hexanedimethanol, 1,6-hexanediol, 2,2-dimethyl-1,3-propanediol, poly(ethylene glycol), poly(tetrahydrofuran), glycerol, or pentaerythritol). Some of these acid and alcohol moieties can be obtained from renewable crop raw material.

A problem with 2,5-furandicarboxylate polyesters, such as PEF, is that they are relatively expensive compared to the conventional polymers used in plastic bottles. Accordingly, there is a need for improved solutions for plastic bottles providing heat stability and oxygen barrier properties at an acceptable cost.

DESCRIPTION OF THE INVENTION

It is an object of the present disclosure to provide plastic containers obtainable by stretch blow molding, said containers providing heat stability and oxygen barrier properties at an acceptable cost.

It is a further object of the present disclosure to provide container preforms for stretch blow molding plastic containers providing heat stability and oxygen barrier properties at an acceptable cost.

It is a further object of the present disclosure to provide a container and a container preform made at least partially from renewable raw materials.

The above-mentioned objects, as well as other objects as will be realized by the skilled person in the light of the present disclosure, are achieved by the various aspects of the present disclosure.

The term "preform" used herein refers to an injection molded plastic form used in the production of stretch blow molded articles. Typically, preforms are produced with the neck of the container, including threads (the "neck finish") on one end. Preform dimensions are a function of blown container geometry and volume. A "multilayer preform" refers to a preform having different layers formed of different materials, which can be prepared by co-injection molding processes.

According to a first aspect illustrated herein, there is provided a multilayer container preform,
  said preform comprising a base, a body and a neck finish,
  said base and body comprising an outer layer defining an exterior surface, an inner layer defining an interior surface and interior space, and an intermediate layer disposed between the outer layer and the inner layer, said outer layer and said inner layer comprising a primary material selected from the group consisting of a 2,5-furandicarboxylate polyester or co-polyester or a blend thereof, and said intermediate layer comprising a secondary material different from the primary material, but compatible with the primary material.

In other words, the present disclosure provides a multilayer container preform with the base and body outer and inner layers comprising a 2,5-furandicarboxylate polyester or co-polyester or a blend thereof and an intermediate layer of a different, preferably less expensive material sandwiched between the outer and inner layers. The preform can be manufactured with a co-injection molding process, and a container can be formed by stretch blow molding the preform with a standard stretch blow molding process. The barrier performance and cost of the container can be tailored by varying the amount and type of the second material to meet the needs of a specific application.

The inventors have found that using the multilayer structure of the inventive preform, even a thin outer and inner layer comprising the more expensive 2,5-furandicarboxylate polyester or co-polyester or a blend thereof, sandwiching a thicker layer of a cheaper and less heat stable polyester, can significantly increase the heat stability of the finished container product. Thus, the heat stability of the finished container product can be significantly increased using only a relatively small amount of the more expensive polymer.

A further benefit of the invention is that there is no need for an expensive heat-set process. There is also no need for an internal coating as the intrinsic barrier properties of the primary material are sufficient. The invention may also contribute to reduction of the logistic costs by reducing the weight of the container.

In some embodiments, the outer layer, the inner layer, or both the outer layer and the inner layer comprise at least 75 wt % of the primary material selected from the group consisting of a 2,5-furandicarboxylate polyester or co-polyester or a blend thereof. In a preferred embodiment, the outer layer, the inner layer, or both the outer layer and the inner layer consist, or substantially consist, of the primary material selected from the group consisting of a 2,5-furandicarboxylate polyester or co-polyester or a blend thereof.

The preform comprises a base, a body and a neck finish. As used herein, the term neck finish includes the threaded portion used for capping the finished container, and optionally also a capping flange formed below the threaded portion. The base refers to the sealed end of the preform, opposite the neck finish. The body refers to the substantially tubular section extending between the neck finish and the base, enclosing the main portion of the interior space of the preform, and typically including a tapered section towards the neck finish.

The neck finish and base of the container are especially important in hot-fill applications. Therefore, to improve the performance of the container in hot-fill applications the neck finish and/or the base of the container may be especially reinforced.

To improve the performance of the container in hot-fill applications, the neck finish preferably comprises a material selected from the group consisting of a 2,5-furandicarboxylate polyester or co-polyester or a blend thereof, preferably the primary material.

In some embodiments, the neck finish comprises at least 75 wt % of the primary material selected from the group consisting of a 2,5-furandicarboxylate polyester or co-polyester or a blend thereof. In a preferred embodiment, the neck finish consists, or substantially consists, of the primary material selected from the group consisting of a 2,5-furandicarboxylate polyester or co-polyester or a blend thereof.

To improve the performance of the container in hot-fill applications, the base may comprise at least one additional layer comprising a material selected from the group consisting of a 2,5-furandicarboxylate polyester or co-polyester or a blend thereof, preferably the primary material.

In some embodiments, the at least one additional layer at the base comprises at least 75 wt % of the primary material selected from the group consisting of a 2,5-furandicarboxylate polyester or co-polyester or a blend thereof. In a preferred embodiment, the at least one additional layer at the base consists, or substantially consists, of the primary material selected from the group consisting of a 2,5-furandicarboxylate polyester or co-polyester or a blend thereof.

In some embodiments, said 2,5-furandicarboxylate polyester or co-polyester or a blend thereof is selected from the group consisting of poly(ethylene-2,5-furandicarboxylate) (PEF), poly(trimethylene-2,5-furandicarboxylate) (PTF), poly(butylene-2,5-furandicarboxylate) (PBF), poly(pentylene-2,5-furandicarboxylate) (PPeF), poly(isosorbide-2,5-furandicarboxylate) (PISF), poly(isoidide-2,5-furandicarboxylate) (PIIF), poly(isomannide-2,5-furandicarboxylate) (PIMF), poly(neopentylene-2,5-furandicarboxylate) (PNPGF), poly(ethylene-2,5-furandicarboxylate) with 1,8-naphthalene dicarboxylate (PEFPEN), poly(1,4-phenylene-2,5-furandicarboxylate) (PCHF), poly(1,2-dimethylphenylene-2,5-furandicarboxylate) (PDMFF), and any combinations, mixtures, or copolymers thereof.

In some embodiments, said 2,5-furandicarboxylate polyester or co-polyester or a blend thereof comprises a polyester or co-polyester of 2,5-furandicarboxylate with one or more diols selected from the group consisting 2,2,4,4-tetramethyl-1,3-cyclobutanediol, 1,3-cyclohexanedimethanol, 1,4-cyclohexandimethanol, or any combination thereof.

The secondary material is different from the primary material, but compatible with the primary material such that the secondary material can be co-extrusion molded together with the primary material. In other words, secondary material and the primary material are co-extrudable. The skilled person understands which parameters are important for successfully co-extruding two materials together. In preferred embodiments, the primary material and the secondary material are chemically similar. Preferably, the primary material and the secondary material have compatible glass transition temperatures ($T_g$) and melt temperatures ($T_m$). The glass transition temperature of the primary material should preferably be between 85% and 115% of the glass transition temperature of the secondary material.

The secondary material is preferably less expensive than the primary material. To reduce cost, the secondary material is preferably free of a 2,5-furandicarboxylate polyester or co-polyester or a blend thereof. In any event, the secondary material comprises less of a 2,5-furandicarboxylate polyester or co-polyester or a blend thereof than the primary material. Preferably, the secondary material comprises at least 50% less of a 2,5-furandicarboxylate polyester or co-polyester or a blend thereof than the primary material.

In some embodiments, the secondary material is a polyester, preferably a terephthalate polyester or co-polyester or a blend thereof, more preferably polyethylene terephthalate (PET) or a co-polyester or a blend thereof.

In preferred embodiments, the secondary material is bio-based or made at least partially from renewable raw materials.

In some embodiments, the secondary material is a bio-based polymer, preferably a bio-based polyester.

In some embodiments, both said primary material and said secondary material are bio-based.

The primary material preferably has a higher glass transition temperature than the secondary material, such that the primary material provides heat stability to a less heat stable secondary material. In some embodiments, the primary material has a higher glass transition temperature than the secondary material.

In some embodiments, the primary material has a lower oxygen transmission rate than the secondary material when measured under the same conditions. The high intrinsic barrier properties of the primary material allow for a secondary material having lower intrinsic barrier properties.

In some embodiments, the primary material has a higher oxygen transmission rate than the secondary material when measured under same conditions. In some applications, where very high barrier properties are desired, the secondary material may be a barrier material having even higher intrinsic barrier properties than the primary material.

In some embodiments, the thickness of the intermediate layer of the preform is greater than the thickness of at least one of the outer and inner layers. In some embodiments, the thickness of the intermediate layer is greater than the thickness of each of the outer and inner layers. In some embodiments, the thickness of the intermediate layer is greater than the thickness of the outer and inner layers combined.

In some embodiments, the thickness of the outer layer is the same or substantially the same as the thickness of the inner layer at the same position of the multilayer container preform. Having the same or substantially the same thickness of the outer and inner layer can help to prevent deformation of the multilayer container preform or multilayer container when it is subjected to heat.

In some embodiments, the weight ratio between said primary material and said secondary material in said preform is in the range of 1:10 to 10:1, preferably in the range of 1:10 to 1:1, and more preferably in the range of 1:5 to 1:1.

In some embodiments, the weight ratio between said primary material and said secondary material in the base and body of said preform is in the range of 1:10 to 10:1, preferably in the range of 1:10 to 1:1, and more preferably in the range of 1:5 to 1:1.

In some embodiments, the preform is obtained by co-injection molding.

In some embodiments, the preform has a length in the range of 20 to 400 mm.

According to a second aspect illustrated herein, there is provided a multilayer container,
  said container comprising a base, a body and a neck finish,
  said base and body comprising an outer layer defining an exterior surface, an inner layer defining an interior surface and interior space, and an intermediate layer disposed between the outer layer and the inner layer,
  said outer layer and said inner layer comprising a primary material selected from the group consisting of a 2,5-furandicarboxylate polyester or co-polyester or a blend thereof, and
  said intermediate layer comprising a secondary material different from the primary material, but compatible with the primary material.

In some embodiments, said neck finish comprises a material selected from the group consisting of a 2,5-furandicarboxylate polyester or co-polyester or a blend thereof, preferably the primary material.

In some embodiments, said base comprises at least one additional layer comprising the primary material selected from the group consisting of a 2,5-furandicarboxylate polyester or co-polyester or a blend thereof.

In some embodiments, the container is formed from a multilayer container preform described above with reference to the first aspect.

In some embodiments, the container is a food or beverage container, preferably a beverage bottle.

In some embodiments, the container is a hot-fill container.

In some embodiments, the outer layer, the inner layer, or both the outer layer and the inner layer comprise at least 75 wt % of the primary material selected from the group consisting of a 2,5-furandicarboxylate polyester or co-polyester or a blend thereof. In a preferred embodiment, the outer layer, the inner layer, or both the outer layer and the inner layer consist, or substantially consist, of the primary material selected from the group consisting of a 2,5-furandicarboxylate polyester or co-polyester or a blend thereof.

The container comprises a base, a body and a neck finish. As used herein, the term neck finish includes the threaded portion used for capping the container, and optionally also a capping flange formed below the threaded portion. The base refers to the sealed end of the container, opposite the neck finish. The body refers to the substantially tubular section extending between the neck finish and the base, enclosing the main portion of the interior space of the container, and typically including a tapered section towards the neck finish.

The neck finish and base of the container are especially important in hot-fill applications. Therefore, to improve the performance of the container in hot-fill applications the neck finish and/or the base of the container may be especially reinforced.

To improve the performance of the container in hot-fill applications, the neck finish preferably comprises a material selected from the group consisting of a 2,5-furandicarboxylate polyester or co-polyester or a blend thereof, preferably the primary material.

In some embodiments, the neck finish comprises at least 75 wt % of the primary material selected from the group consisting of a 2,5-furandicarboxylate polyester or co-polyester or a blend thereof. In a preferred embodiment, the neck finish consists, or substantially consists, of the primary material selected from the group consisting of a 2,5-furandicarboxylate polyester or co-polyester or a blend thereof.

To improve the performance of the container in hot-fill applications, the base may comprise at least one additional layer comprising a material selected from the group consisting of a 2,5-furandicarboxylate polyester or co-polyester or a blend thereof, preferably the primary material.

In some embodiments, the at least one additional layer at the base comprises at least 75 wt % of the primary material selected from the group consisting of a 2,5-furandicarboxylate polyester or co-polyester or a blend thereof. In a preferred embodiment, the at least one additional layer at the base consists, or substantially consists, of the primary material selected from the group consisting of a 2,5-furandicarboxylate polyester or co-polyester or a blend thereof.

In some embodiments, said 2,5-furandicarboxylate polyester or co-polyester or a blend thereof is selected from the group consisting of poly(ethylene-2,5-furandicarboxylate) (PEF), poly(trimethylene-2,5-furandicarboxylate) (PTF), poly(butylene-2,5-furandicarboxylate) (PBF), poly(pentylene-2,5-furandicarboxylate) (PPeF), poly(isosorbide-2,5-furandicarboxylate) (PISF), poly(isoidide-2,5-furandicarboxylate) (PIIF), poly(isomannide-2,5-furandicarboxylate) (PIMF), poly(neopentylene-2,5-furandicarboxylate)

(PNPGF), poly(ethylene-2,5-furandicarboxylate) with 1,8-naphthalene dicarboxylate (PEFPEN), poly(1,4-phenylene-2,5-furandicarboxylate) (PCHF), poly(1,2-dimethylphenylene-2,5-furandicarboxylate) (PDMFF), and any combinations, mixtures, or copolymers thereof.

In some embodiments, said 2,5-furandicarboxylate polyester or co-polyester or a blend thereof comprises a polyester or co-polyester of 2,5-furandicarboxylate with one or more dials selected from the group consisting 2,2,4,4-tetramethyl-1,3-cyclobutanediol, 1,3-cyclohexanedimethanol, 1,4-cyclohexandimethanol, or any combination thereof.

The secondary material is different from the primary material, but compatible with the primary material such that the secondary material can be co-extrusion molded together with the primary material. The secondary material is preferably less expensive than the primary material. To reduce cost, the secondary material is preferably free of a 2,5-furandicarboxylate polyester or co-polyester or a blend thereof. In any event, the secondary material comprises less of a 2,5-furandicarboxylate polyester or co-polyester or a blend thereof than the primary material. Preferably, the secondary material comprises at least 50% less of a 2,5-furandicarboxylate polyester or co-polyester or a blend thereof than the primary material.

In some embodiments, the secondary material is a polyester, preferably a terephthalate polyester or co-polyester or a blend thereof, more preferably polyethylene terephthalate (PET) or a co-polyester or a blend thereof.

In preferred embodiments, the secondary material is bio-based or made at least partially from renewable raw materials.

In some embodiments, the secondary material is a bio-based polymer, preferably a bio-based polyester.

In some embodiments, both said primary material and said secondary material are bio-based.

The primary material preferably has a higher glass transition temperature than the secondary material, such that the primary material provides heat stability to a less heat stable secondary material. In some embodiments, the primary material has a higher glass transition temperature than the secondary material.

In some embodiments, the primary material has a lower oxygen transmission rate than the secondary material when measured under the same conditions. The high intrinsic barrier properties of the primary material allow for a secondary material having lower intrinsic barrier properties.

In some embodiments, the primary material has a higher oxygen transmission rate than the secondary material when measured under same conditions. In some applications, where very high barrier properties are desired, the secondary material may be a barrier material having even higher intrinsic barrier properties than the primary material.

In some embodiments, the thickness of the intermediate layer of the container is greater than the thickness of at least one of the outer and inner layers. In some embodiments, the thickness of the intermediate layer is greater than the thickness of each of the outer and inner layers. In some embodiments, the thickness of the intermediate layer is greater than the thickness of the outer and inner layers combined.

In some embodiments, the weight ratio between said primary material and said secondary material in said container is in the range of 1:10 to 10:1, preferably in the range of 1:10 to 1:1, and more preferably in the range of 1:5 to 1:1.

In some embodiments, the weight ratio between said primary material and said secondary material in the base and body of said container is in the range of 1:10 to 10:1, preferably in the range of 1:10 to 1:1, and more preferably in the range of 1:5 to 1:1.

In some embodiments, the container is obtained by stretch blow molding.

In some embodiments, the interior space of the container has a volume in the range of 100 ml to 5000 ml.

The preform as described with reference to the first aspect can be used to produce the container as described with reference to the second aspect by stretch blow molding. Stretch blow molding permits the formation of hollow articles, such as bottles. Single stage, two stage, and double blow molding manufacturing systems are well known in the art. In both processes, plastic resin is converted into containers by the injection molding of preforms, followed by biaxial orientation (stretching) of these preforms, either in a continuous single-stage or a discontinuous two-stage process of blow molding. Orientation refers to the physical alignment of the polymer chains in a regular configuration. Biaxial orientation permits thinner, more uniform sidewalls and thus less expensive containers, and also enhances the containers physical properties, such as physical properties, clarity, and gas barrier properties, which are all important in products such as bottles for carbonated beverages.

Preforms are conventionally formed by injection molding, in which molten resin is introduced into a mold in the desired preform shape. In the one-stage process, preforms are injection molded, conditioned to the proper temperature, and blown into containers in one continuous process. In the two-stage process, preforms are injection molded, stored for a short period of time, and then reheated to about the glass transition temperature of the material and blown into containers.

According to a third aspect illustrated herein, there is provided a method of producing a multilayer container preform, comprising:
  a) providing a primary material selected from the group consisting of a 2,5-furandicarboxylate polyester or co-polyester or a blend thereof, and a secondary material different from the primary material, but compatible with the primary material;
  b) optionally injection molding the primary material to form a neck finish of the preform;
  c) co-injection molding the primary and secondary material to form a body and base of the preform, said base and body comprising an outer layer defining an exterior surface, an inner layer defining an interior surface and interior space, said outer layer and said inner layer comprising the primary material, and an intermediate layer disposed between the outer layer and the inner layer, said intermediate layer comprising the secondary material; and
  d) optionally injection molding at least one additional layer comprising the primary material at the base of the preform.

The primary and secondary material and the resulting preform may be further defined as described above with reference to the first aspect.

According to a third aspect illustrated herein, there is provided a method of producing a multilayer container, comprising:
  a) providing a preform as described above with reference to the first aspect or a preform obtained the method described above with reference to the third aspect; and
  b) stretch blow molding the preform to provide the multilayer container.

The preform and the resulting multilayer container may be further defined as described above with reference to the first and second aspects, respectively.

As used herein, the term polymer or polymeric and similar terms are used in their ordinary sense as understood by one skilled in the art, and thus may be used herein to refer to or describe a large molecule that contains recurring units. Polymers may be formed in various ways, including by polymerizing monomers and/or by chemically modifying one or more recurring units of a precursor polymer. A polymer may be a homopolymer comprising substantially identical recurring units formed by, e.g., polymerizing a particular monomer. A polymer may also be a copolymer comprising two or more different recurring units formed by, e.g., copolymerizing two or more different monomers, and/or by chemically modifying one or more recurring units of a precursor polymer.

Generally, while the products, polymers, compositions, materials, layers and processes are described in terms of "comprising" various components or steps, the products, polymers, compositions, materials, layers and processes can also "consist essentially of" or "consist of" the various components and steps.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A multilayer container preform, said preform comprising:
    a base, a body, and a neck finish,
    said base and said body comprising an outer layer defining an exterior surface, an inner layer defining an interior surface and interior space, and an intermediate layer disposed between the outer layer and the inner layer,
    said outer layer and said inner layer comprising a primary material selected from a group consisting of a 2,5-furandicarboxylate polyester or a 2,5-furandicarboxylate co-polyester or a blend thereof, and
    said intermediate layer comprising a secondary material different from the primary material, the secondary material compatible with the primary material,
    wherein the secondary material is a polyester.

2. The preform according to claim 1, wherein said neck finish comprises a material selected from a group consisting of: a 2,5-furandicarboxylate polyester or a 2,5-furandicarboxylate co-polyester or a blend thereof.

3. The preform according to claim 1, wherein said base comprises at least one additional layer comprising a material selected from a group consisting of a 2,5-furandicarboxylate polyester or a 2,5-furandicarboxylate co-polyester or a blend thereof.

4. The preform according to claim 1, wherein said 2,5-furandicarboxylate polyester or the 2,5-furandicarboxylate co-polyester or the blend thereof is selected from a group consisting of: poly(ethylene-2,5-furandicarboxylate) (PEF), poly(trimethylene-2,5-furandicarboxylate) (PTF), poly (butylene-2,5-furandicarboxylate) (PBF), poly(pentylene-2,5-furandicarboxylate) (PPeF), poly(isosorbide-2,5-furandicarboxylate) (PISF), poly(isoidide-2,5-furandicarboxylate) (PIIF), poly(isomannide-2,5-furandicarboxylate) (PIMF), poly(neopentylene-2,5-furandicarboxylate) (PNPGF), poly (ethylene-2,5-furandicarboxylate) with 1,8-naphthalene dicarboxylate (PEFPEN), poly(1,4-phenylene-2,5-furandicarboxylate) (PCHF), poly(1,2-dimethylphenylene-2,5-furandicarboxylate) (PDMFF), and combinations, mixtures, or copolymers thereof.

5. The preform according to claim 1, wherein said 2,5-furandicarboxylate polyester or the 2,5-furandicarboxylate co-polyester or the blend thereof comprises a polyester of 2,5-furandicarboxylate or co-polyester of 2,5-furandicarboxylate with one or more diols selected from a group consisting of 2,2,4,4-tetramethyl-1,3-cyclobutanediol, 1,3-cyclohexanedimethanol, 1,4-cyclohexandimethanol, and combinations thereof.

6. The preform according to claim 1, wherein the secondary material is a bio-based polymer.

7. The preform according to claim 1, wherein both said primary material and said secondary material are bio-based.

8. The preform according to claim 1, wherein the primary material has a higher glass transition temperature than the secondary material.

9. The preform according to claim 1, wherein the primary material has a lower oxygen transmission rate than the secondary material when measured under the same conditions.

10. The preform according to claim 1, wherein the primary material has a higher oxygen transmission rate than the secondary material when measured under same conditions.

11. The preform according to claim 1, wherein a weight ratio between said primary material and said secondary material in said preform is in a range of 1:10 to 10:1.

12. The preform according to claim 1, wherein the preform is obtained by co-injection molding.

13. The preform according to claim 1, wherein the preform has a length in a range of 20 to 400 mm.

14. A multilayer container formed from a multilayer container preform according to claim 1.

15. A multilayer container, said multilayer container comprising:
    a base, a body, and a neck finish,
    said base and body comprising an outer layer defining an exterior surface, an inner layer defining an interior surface and interior space, and an intermediate layer disposed between the outer layer and the inner layer,
    said outer layer and said inner layer comprising a primary material selected from a group consisting of a 2,5-furandicarboxylate polyester or a 2,5-furandicarboxylate co-polyester or a blend thereof, and
    said intermediate layer comprising a secondary material different from the primary material, said secondary material compatible with the primary material, and,
    wherein the secondary material is a polyester.

16. The multilayer container according to claim 15, wherein said neck finish comprises a material selected from a group consisting of a 2,5-furandicarboxylate polyester or a 2,5-furandicarboxylate co-polyester or a blend thereof.

17. The multilayer container according to claim 15, wherein said base comprises at least one additional layer comprising the primary material.

18. A multilayer container according to claim 15, wherein the container is a food or beverage container.

19. A multilayer container according to claim 15, wherein the container is a hot-fill container.

20. A method of producing a multilayer container preform, the method comprising:
provide a primary material selected from a group consisting of a 2,5-furandicarboxylate polyester or a 2,5-furandicarboxylate co-polyester or a blend thereof, and a secondary material different from the primary material, the second material compatible with the primary material, and wherein the secondary material is a polyester;
co-injection molding the primary and secondary materials to form a body and base of the preform, said base and body comprising an outer layer defining an exterior surface, an inner layer defining an interior surface and interior space, said outer layer and said inner layer comprising the primary material, and an intermediate layer disposed between the outer layer and the inner layer, said intermediate layer comprising the secondary material.

21. The method of producing a multilayer container preform of claim 20 further comprising:
stretch blow molding the preform to provide a multilayer container.

\* \* \* \* \*